US007665076B2

(12) United States Patent
Clement et al.

(10) Patent No.: US 7,665,076 B2
(45) Date of Patent: Feb. 16, 2010

(54) METHOD AND APPARATUS FOR ACTIVATING/DEACTIVATING RUN-TIME DETERMINED SOFTWARE ROUTINES IN JAVA COMPILED BYTECODE APPLICATIONS

(75) Inventors: Andrew S. Clement, Fair Oak (GB); Matthew A. Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/860,412

(22) Filed: Jun. 3, 2004

(65) Prior Publication Data

US 2005/0097534 A1 May 5, 2005

(30) Foreign Application Priority Data

Nov. 1, 2003 (GB) ................................. 0325553.6

(51) Int. Cl.
*G06F 9/45* (2006.01)
(52) U.S. Cl. ....................................... 717/148; 717/154
(58) Field of Classification Search ................. 717/127, 717/128
See application file for complete search history.

(56) References Cited

U.S. PATENT DOCUMENTS

| | | | | |
|---|---|---|---|---|
| 4,807,126 A | * | 2/1989 | Gotou et al. ................. | 717/160 |
| 5,067,068 A | * | 11/1991 | Iwasawa et al. ............. | 717/160 |
| 5,862,384 A | * | 1/1999 | Hirai .......................... | 717/160 |
| 6,286,136 B1 | * | 9/2001 | Watanabe et al. ........... | 717/116 |
| 7,024,434 B2 | * | 4/2006 | Fuller et al. ................. | 707/203 |
| 7,089,544 B2 | * | 8/2006 | Hickson ...................... | 717/148 |
| 7,124,405 B1 | * | 10/2006 | Kakivaya et al. ............ | 717/143 |

OTHER PUBLICATIONS

Suganuma et al. "Overview of the IBM Java Just-in-Time Compiler".*
JAVA.SUN.COM "The Java HotSpot Virtual Machine, V1.4.0 p. 3".*
JAVA.SUN.COM "The Java HotSpot Virtual Machine, V1.4.0 p. 4".*
The Java Hotspot Virtual Machine V1.4.0, Dec. 27, 2002.*

* cited by examiner

*Primary Examiner*—Wei Y Zhen
*Assistant Examiner*—Phillip H Nguyen
(74) *Attorney, Agent, or Firm*—Jill A. Poimboeuf; Gregory K Goshorn; Greg Goshorn, P.C.

(57) ABSTRACT

Provided is a JIT compiler that changes the status of run-time determined software routines between being activated and deactivated in an application program. Conditional statements which are used at run-time to determine whether such a routine has been activated or deactivated are presented as discrete conditions that always evaluate to a known result by using an invariant flag in the compiled bytecode. The JIT compiler optimises an application program by excluding discrete condition checks. Consequently, if the branch of the discrete condition that will never execute includes a run-time determined software routine, then the routine will be excluded from the JIT compilation and will not form part of the JIT compiled native machine code. A run-time class or code replacement facility is used as a means of activating or deactivating a run-time determined software routine at run-time by changing the value of the invariant flag of said routine.

9 Claims, 3 Drawing Sheets

METHOD AND APPARATUS FOR ACTIVATING/DEACTIVATING RUN-TIME DETERMINED SOFTWARE ROUTINES IN JAVA COMPILED BYTECODE APPLICATIONS

FIELD OF THE INVENTION

The present invention concerns a method and an apparatus for activating/deactivating run-time determined software routines in Java compiled bytecode applications and particularly to utilising a Java just-in-time (JIT) optimising compiler to facilitate the activation/deactivation of run-time determined software routines.

BACKGROUND OF THE INVENTION

The Java language has rapidly been gaining importance as a standard object-oriented programming language since its advent in late 1995. "Java" is a trademark of Sun Microsystems, Inc. Java programs (also known as Java class files) are converted from a well defined application program source code into an architecture-neutral, machine independent code, called Java bytecode. The Java bytecodes are designed to execute on a Java Virtual Machine (JVM). A JVM is not an actual hardware platform, but is a low level software emulator that can be implemented on many different computer processor architectures and under many different computer operating systems. Thus, the JVM is a virtual computer component that resides only in the memory of a computer platform.

Once an application program source code has been converted into a Java program comprising Java bytecode sequences, the bytecode sequences are then interpreted by a JVM interpreter for each platform. A Java interpreter is a module of the JVM that alternatively decodes and executes the bytecode sequences. Although its platform-neutrality, flexibility, and reusability are all advantages for a programming language, the execution by interpretation imposes an unacceptable performance penalty, mainly on account of the run-time overhead of the bytecode instruction fetch and decode.

One means of improving the run-time performance of an executed program is to use a Java just-in-time (JIT) compiler, which compiles the Java class files "on the fly" into equivalent sequences of the native code of the underlying machine. Such JIT compiled native machine code executes more quickly than Java class files that are decoded and executed using a Java interpreter thus significantly improving the performance of program execution, but the overall program execution time, in contrast to that of a conventional static compiler, now includes the compilation overhead of the JIT compiler. It is therefore important for the JIT compiler to be fast and lightweight, as well as to generate high-quality native code. This is particularly true for applications where Java programs are distributed in real time across a computer network such as the Internet.

The use of variant flags is known in the Java programming language. A variant flag is an application flag whose value can change at runtime. It is known to use variant flags in connection with conditional checking statements to determine, at run-time, whether a program routine has been activated or deactivated. It can be desirable to defer decisions regarding the inclusion or exclusion of software routines in the execution of an application program until run-time. These routines are referred to as "run-time determined software routines". An example of a run-time determined software routine in a Java program is the method of logging/tracing the execution of methods of a Java class file. A determination to execute such a run-time determined software routine can be made by including a conditional checking statement which checks a variant flag in the form of a Boolean parameter at every method entry and exit to determine if the routine has been activated at run-time. If the routine has been activated, it can be executed. However, if the routine is determined not to have been activated, it can be skipped. The Boolean parameter is variable in that it can be changed during run-time by a program user to activate or deactivate the routine as required. A drawback with this technique of determining whether a run-time determined software routine has been activated and is thus to be executed or has been deactivated and is thus to be skipped is that all run-time determined software routines need to be included in the application program in the event that any of them are activated during run-time. As a consequence, the application program has a large footprint at run-time which is undesirable for Java JIT compilation environments. In addition, the conditional checking statements take time to evaluate which increases the run-time overhead of the application program.

Java JIT compilers can perform optimisations on the compiled Java program including method inlining, exception check elimination, common sub-expression elimination and loop versioning. In addition, one optimisation a JIT compiler can undertake is to exclude redundant data from the compiled native machine code. Redundant code includes code which is never executed and code which always resolves to a known, discrete result. However, a variant flag prevents a Java JIT compiler from excluding conditional checking statements and thus run-time determined software routines from compiled native machine code even when the run-time determined software routine has been deactivated because the conditional checking statements are indeterminate due to the use of the variant flag.

SUMMARY OF THE INVENTION

An object of the present invention is to mitigate and/or obviate known disadvantages associated with Java JIT compilation of application programs including run-time determined software routines.

Accordingly, in a first aspect the present invention provides a method of changing a status of a run-time determined software routine between activated and deactivated, comprising the steps of: employing an invariant flag to evaluate a conditional statement associated with said run-time determined software routine to determine its status as one of activated or deactivated, said invariant flag being selected to cause said conditional statement to always evaluate to a known result; and during run-time, utilising a run-time code replacement facility to change said invariant flag to one that causes said conditional statement to always evaluate to a different known result.

The use of an invariant flag to resolve a conditional checking statement to determine whether a run-time determined software routine is activated or deactivated makes the conditional checking statement one which is determinate, i.e. resolves to a known result, and thus does not prevent Java JIT optimisation of the routine if activated. In addition, the use of a code or class replacement facility allows the decision of whether the run-time routine is to be executed or not until run-time rather than being made at program initialisation.

Preferably, the invariant flag comprises one of a final static Boolean parameter, a numerical test on an invariant field and a hard coded statement, and said step of utilising a run-time code replacement facility to change said invariant flag comprises changing a value of the Boolean parameter, changing the invariant field or replacing the hard coded statement by its converse.

Preferably, the method includes the step of just-in-time (JIT) compiling methods of the Java class file and the step of JIT compiling the methods of the Java class file includes JIT optimising said methods to exclude from compiled native machine code the run-time determined software routine when the invariant flag is selected to cause the conditional statement associated with said routine to evaluate to "False".

The run-time code replacement facility may comprise one of the Sun Microsystems' "Hotswap class file replacement" feature for its Java Platform Debugger Architecture (JPDA) or IBM's "Hot Code Replace" (HCR) feature for its "J9" JVM platform.

The method may include the step of a Java interpreter maintaining a method invocation count for each method of the Java class file and the step of JIT compiling only those methods whose invocation count exceeds a threshold value.

Consequently, little used methods are not JIT compiled which reduces processing overhead for executed methods.

In accordance with a second aspect of the invention, there is provided a method of compiling a Java class file comprising the steps of: loading a Java class file containing a run-time determined software routine into a Java Virtual Machine (JVM) hosted on a computer platform; initialising said Java class file; determining from an invariant flag associated with said run-time determined software routine that said routine is deactivated; just-in-time (JIT) compiling said Java class file in a Java JIT compiler; and optimising said Java class file in said Java JIT compiler to exclude said run-time determined software routine from JIT compiled native machine code of the computer platform.

Preferably, the method includes the steps of using a run-time code replacement facility to change the invariant flag associated with said run-time determined software routine; determining from the changed invariant flag that the run-time determined software routine has been activated; determining in the JIT compiler a JIT optimised method linked to the run-time determined software routine; reverting the method to a pre-JIT optimised version; and JIT recompiling and optimising said method to include said run-time determined software in JIT compiled native machine code.

In accordance with a third aspect of the invention, there is provided a method of just-in-time (JIT) compiling a Java class file comprising the steps of: loading a Java class file containing a run-time determined software routine into a Java Virtual Machine (JVM) hosted on a computer platform; initialising said Java class file; determining from an invariant flag associated with said run-time determined software routine that said routine is activated; just-in-time (JIT) compiling said Java class file in a Java JIT compiler; and optimising said Java class file in said Java JIT compiler to include said run-time determined software routine from JIT compiled native machine code of the computer platform.

Preferably, the method includes the steps of using a run-time code replacement facility to change the invariant flag associated with said run-time determined software routine; determining from the changed invariant flag that the run-time determined software routine has been deactivated; determining in the JIT compiler a JIT optimised method linked to the run-time determined software routine; reverting the method to a pre-JIT optimised version; and JIT recompiling and optimising said method to exclude said run-time determined software in JIT compiled native machine code.

In accordance with a fourth aspect of the invention, there is provided a Java Virtual Machine (JVM) arranged to carry out the methods of the first to third aspects of the invention.

In accordance with a fifth aspect of the invention, there is provided a Java JIT compiler to carry our the methods of the first to third aspects of the invention.

According to a sixth aspect of the invention, there is provided a computer program product in a computer readable medium for carrying out the methods of the first to third aspects of the invention.

BRIEF DESCRIPTION OF THE DRAWINGS

The foregoing and further features of the present invention will be more readily understood from the following description of a preferred embodiment, by way of example only, with reference to the accompanying drawings of which.

DESCRIPTION OF A PREFERRED EMBODIMENT

Figure 1:
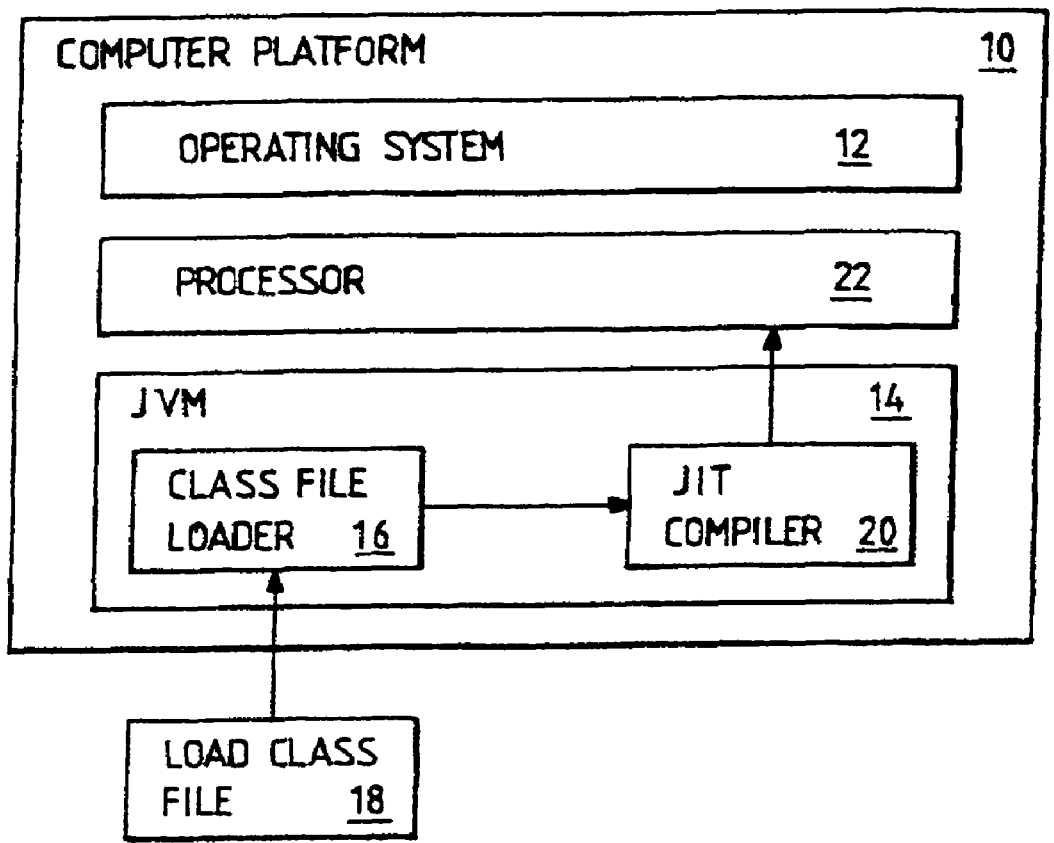
FIG. 1 is a block schematic diagram of a Java Virtual Machine (JVM) on a host computer platform in the prior art.

In a preferred embodiment of the present invention, a Java JIT compiler is used to facilitate the changing of the status of run-time determined software routines between being activated and deactivated in an application program. The preferred embodiment uses the conditional statements at run-time to determine whether such a routine has been activated or deactivated. The conditional statements are discrete conditions that always evaluate to a known result by using an invariant flag in the form of a final static Boolean data type, a numerical test on an invariant field or a hard coded "true or false" method in the compiled Java bytecode. Such conditions are considered to be discrete conditions by a Java JIT compiler as they always evaluate to the same result. The JIT compiler optimises an application program by excluding discrete condition checks and further excluding a branch of the condition which will never execute, i.e. only the branch of the condition that evaluates to "true" will be included in the JIT compiled native machine code. Consequently, if the branch of the discrete condition that will never execute includes a run-time determined software routine, then the routine will be excluded from the JIT compilation and will not form part of the JIT compiled native machine code. Conversely, if the branch of the discrete condition that will never execute does not include the run-time determined software routine, then the routine will be included in the JIT compilation and will form part of the JIT compiled native machine code.

The preferred embodiment further employs a run-time class or code replacement facility as a means of activating or deactivating a run-time determined software routine at run-time by changing the value of the final static Boolean parameter (invariant flag) of said routine. Using such a run-time class replacement facility the granularity of replacement is always the class, even though only the implementation of a single method is changed. Once this change has been implemented, the application can be JIT compiled to include or exclude, as appropriate, the run-time determined software routine. The JVM receiving the modified class file data makes a determination of what changes to the system are necessary.

A run-time class replacement facility for use in debugging Java programs during run-time provides the ability to substitute modified code in a running application through the debugger APIs. This feature of the Java Virtual Machine addresses issues such as vendors wanting the ability to do fix-and-continue debugging, i.e. while debugging, identify a problem, fix it, and continue debugging with fixed code, and organisations deploying long running servers wishing to be able to fix bugs without taking down the server.

Sun Microsystems' Java programming language HotSwap class file replacement feature adds functionality to Sun's Java Platform Debugger Architecture (JPDA) to allow a class to be updated while under the control of a debugger. In the referenced implementation, this functionality is implemented at the Java Virtual Machine Debug Interface (JVMDI) layer and made available through the higher layers of JPDA—the Java Debug Wire Protocol (JDWP) and the Java Debug Interface (JDI).

All classes are redefined according to the definitions supplied, and may include redefined methods. If any redefined methods have active stack frames, those active frames continue to run the bytecodes of the previous method. The redefined methods will be used on new invocations. This function does not cause any initialisation except that which would occur under the customary JVM semantics. In other words, redefining a class does not cause its initialisers to be run. The values of pre-existing static variables will remain as they were prior to the call. However, completely un-initialised (new) static variables will be assigned their default value.

International Business Machines (IBM) also provides a similar functionality called "Hot Code Replace" (HCR) for its "J9" JVM platform.

The preferred embodiment of the present invention recognises that this functionality can be employed in a manner not originally intended and in conjunction with conditional checking statements employing invariant flags to provide a useful result. This functionality can be used to dynamically replace the implementation of one or more methods in a class already loaded and in use within the JVM. This is achieved by employing an invariant flag in the form of a final static Boolean data type to indicate when a run-time determined software routine has been activated or deactivated. A Java JIT compiler will not compile a conditional checking statement using the invariant flag where the flag indicates that the run-time determined software routine is deactivated because the invariant flag resolves to a known "false" condition and thus the JIT compiler can exclude it from the optimisation of the compiled code. The run-time class replacement facility can then be utilised to change the value of the invariant flag at run-time in order to activate the deactivated run-time determined software routine, or the converse as appropriate.

Figure 2:
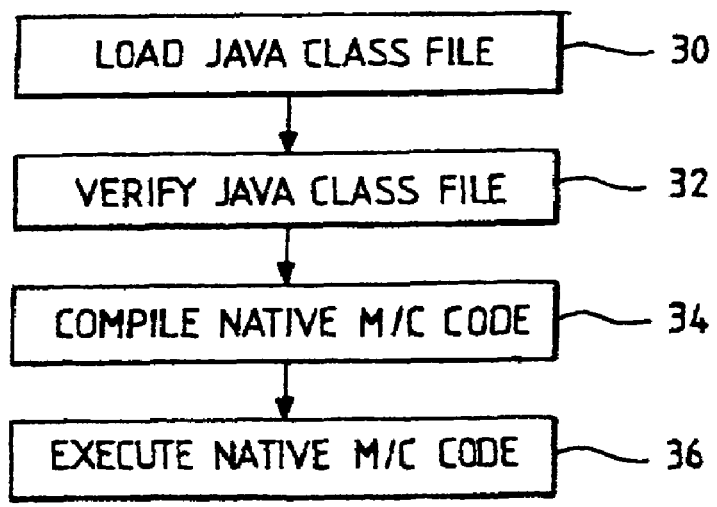
FIG. 2 is a flow diagram of the process steps for JIT compilation and execution of a Java class file in the prior art.

FIGS. 1 and 2 illustrate the apparatus and processes commonly encountered in loading a Java class file, JIT compiling it and then executing it on a host computer platform 10 in the prior art. The host computer platform 10 can be any Java enabled computer architecture as will be familiar to a skilled artisan. The computer platform 10 has an operating system 12 that controls the computer hardware (not shown) in a known manner. The computer platform 10 hosts a JVM 14 that exists as a low level software emulator in the memory (not shown) of the host platform 10 and which operates within the operating system 12 of the host platform 10. The JVM 14 includes a class file loader 16 which comprises an object such as a class file responsible for loading new classes into the JVM run-time environment. New classes may be uploaded from a remote server logically represented by "Load Class File" box 18 in FIG. 1. The JVM 14 also comprises a JIT compiler 20.

Once a Java class file has been loaded into the JVM 14 by the class file loader 16 (step 30 in FIG. 2), the JVM 14 verifies the Java class file to ensure that the loaded class file will not violate the host platform 10 operating system 12 (step 32 of FIG. 23). Following the verification step 32, the class file may be JIT compiled by the JIT compiler 14 (step 34 of FIG. 2) to convert the bytecode form of the class file to the native machine code of a processor 22 of the host computer platform 10 that then executes the native machine code (step 36 of FIG. 2). The JIT compiler 14 may perform optimisations to exclude redundant data from the compiled native machine code.

A method to activate/deactivate a run-time determined software routine during run-time can be illustrated by reference to the use of a log class to perform logging/tracing of the execution of methods of a Java class file.

Typically each method in a class will contain entry/exit logging as represented by the following Java source code equivalent denoted by A:

```
A)
    method ( ) {
        Log.entry( )
        :
        :
        Log.exit( )
    }
``` where the underlying method to be executed is represented by the Java source code equivalent denoted by B:

```
B)
    method ( ) {
        :
        :
    }
```

Consequently, the log class represented by A above will be executed for each entry and exit of every method of the Java class file loaded into the JVM so causing the application program to have a large footprint which is undesirable.

One method of addressing this is to employ a "guard" test to determine whether the logging feature is enabled. This is because the use of logging under normal circumstances is undesirable because of the performance overhead it creates. If logging is disabled then the log class is not executed for a method but the guard test must still be performed for each method of the class file to determine if logging is enabled for that method. Such a guard test is represented by the Java source code equivalent denoted by C below:

```
C)
    method ( ) {
        if (Log.enabled ( )) Log.entry( )
        :
        :
```

-continued

```
    if (Log.enabled ( )) Log.exit( )
}
```

The implementation of the "Log.enabled( )" method typically involves a simple test on a variant flag in the form of a variable Boolean data type to resolve a conditional checking statement. Even using JIT compilation within calling methods to improve performance the "Log.enabled( )" logic must still be executed for every method entry/exit to determine if logging is enabled. In addition the implementation of the logging code must be available at run time even if it is never enabled, increasing the footprint of the system.

An alternative approach is to employ a third class to determine whether logging is enabled as represented by the Java source code equivalent denoted by D:

```
D)
    method ( ) {
        if (LogActivation.enabled ( )) Log.entry( )
            :
            :
        if (LogActivation.enabled ( )) Log.exit( )
    }
```

In this case the Log class will only be loaded if LogActivation is enabled. Once again, this utilises a variant flag in the form of a variable Boolean parameter to resolve a conditional checking statement. However, this presents the problem that conditional checking statements utilising variant flags cannot be optimised by a Java JIT compiler because they are indeterminate at the time of JIT compilation.

Consequently, in the preferred embodiment of the present invention the "enabled( )" method is implemented as a test on a Boolean "variable" declared to be "final", and is thus an invariant flag. This indicates that the final Boolean variable (invariant flag) can only be set once before first reference and never changed by the application during run-time. The result is that Java JIT compilers can perform more aggressive optimisation. If the "enabled( )" test is guaranteed always to be false when the Java JIT compiler compiles a calling method it can then eliminate the log method call altogether thus resulting in it only calling the underlying method as denoted by B above leading to higher performance execution of the base program. If, however, logging is enabled at program initialisation, then the test will always be true. In this case the JIT can also remove the guard test from the compiled code and always call the logging method as denoted by A above. Thus the use of an invariant flag causes the test to become determinate at the time of JIT compilation.

Figure 3:
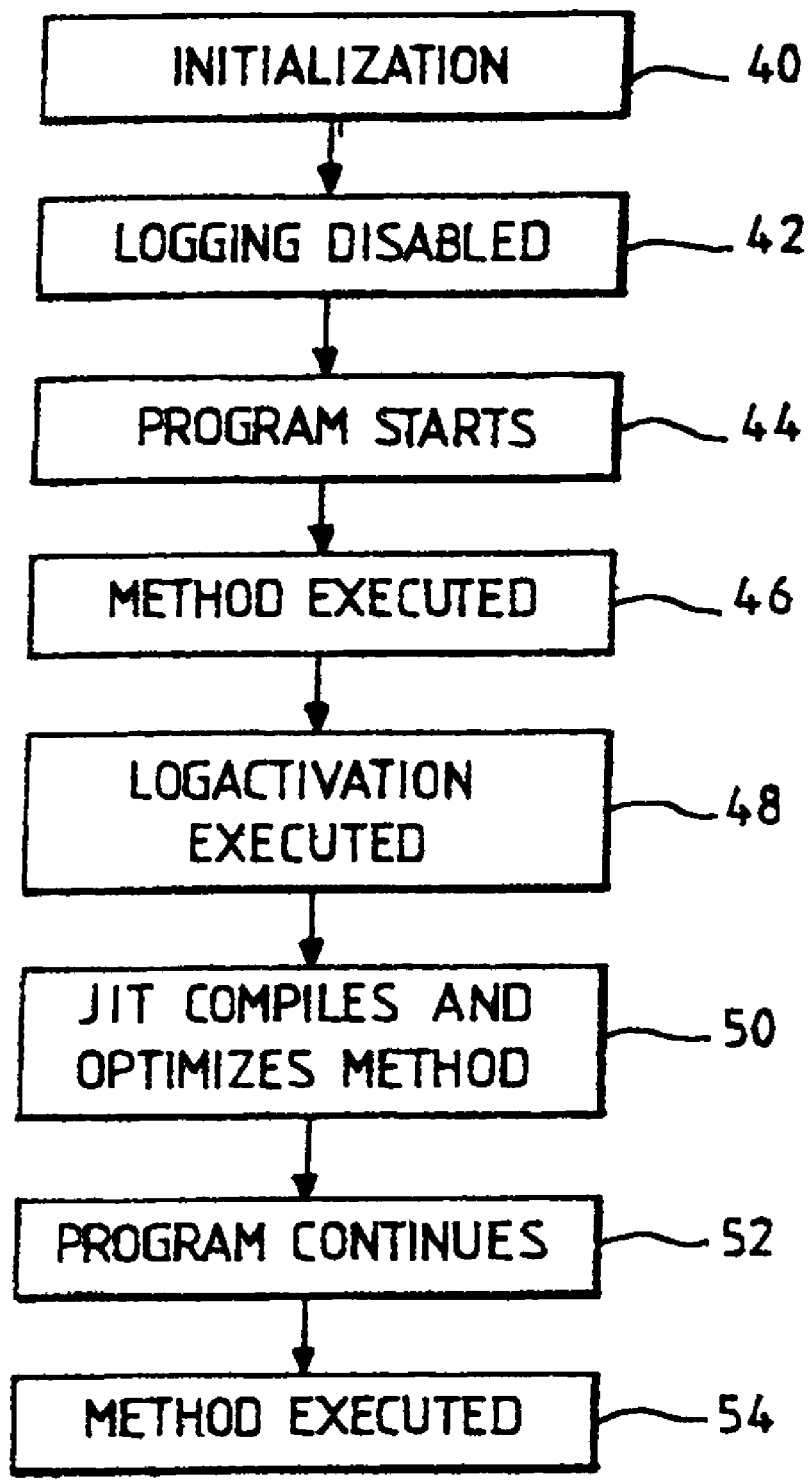
FIG. 3 is a flow diagram of the process steps for JIT compiling a Java class file containing a run-time determined software routine that has been deactivated in accordance with a preferred embodiment of the present invention.

FIG. 3 illustrates the process steps embodying the above described process in the preferred embodiment of the present invention. At program initialisation (step 40) the logging feature is disabled (step 42). This is achieved through the setting of an invariant flag, normally in a static initialiser, within the LogActivation class. When the program starts (step 44) it invokes a method (step 46) which contains logging calls guarded by the LogActivation class (step 48) as described above. Before executing the method the JIT may choose to compile and optimise the bytecode which includes inlining the calls to "enabled( )" (step 50). Because the result of these methods is invariant and also false, due to the initial configuration, the JIT may eliminate the call and the ensuing logging invocation from the generated native code (step 52). The method is then executed (step 54) without logging.

Normally, by employing an invariant flag as discussed above, a program user must decide at program initialisation whether logging is desired, i.e. to be enabled by setting the final static Boolean parameter for the log activation enabled conditional checking statement. This is a performance/flexibility trade-off. The preferred embodiment of the present invention removes this trade-off by making use of a code or class replacement facility such as the Sun Microsystems' Hotswap class file replacement feature for its Java Platform Debugger Architecture (JPDA) or IBM's "Hot Code Replace" (HCR) feature for its "J9" JVM platform. When using an code or class file replacement facility, for example, the Java JIT compiler may still optimise tests made to "final" variables as described above. However should the user change their mind a new implementation of the "LogActivation" class may be loaded into the system. This new implementation will contain a new implementation of the "enabled( )" method typically as the result of a change to a final static Boolean field. Although no additional class initialisation takes place, final static values are part of the class structure and hence their values are changed in the running system if the class is modified. At this point the system must revert to the previous version of each calling method where the new version of "enabled( )" can be executed and the logging feature called as appropriate. The Java JIT compiler is then free to recompile and re-optimise the code again. This way, the advantages of using a "final" static Boolean variable are afforded whilst retaining the ability to change the logging configuration at run time.

Figure 4:
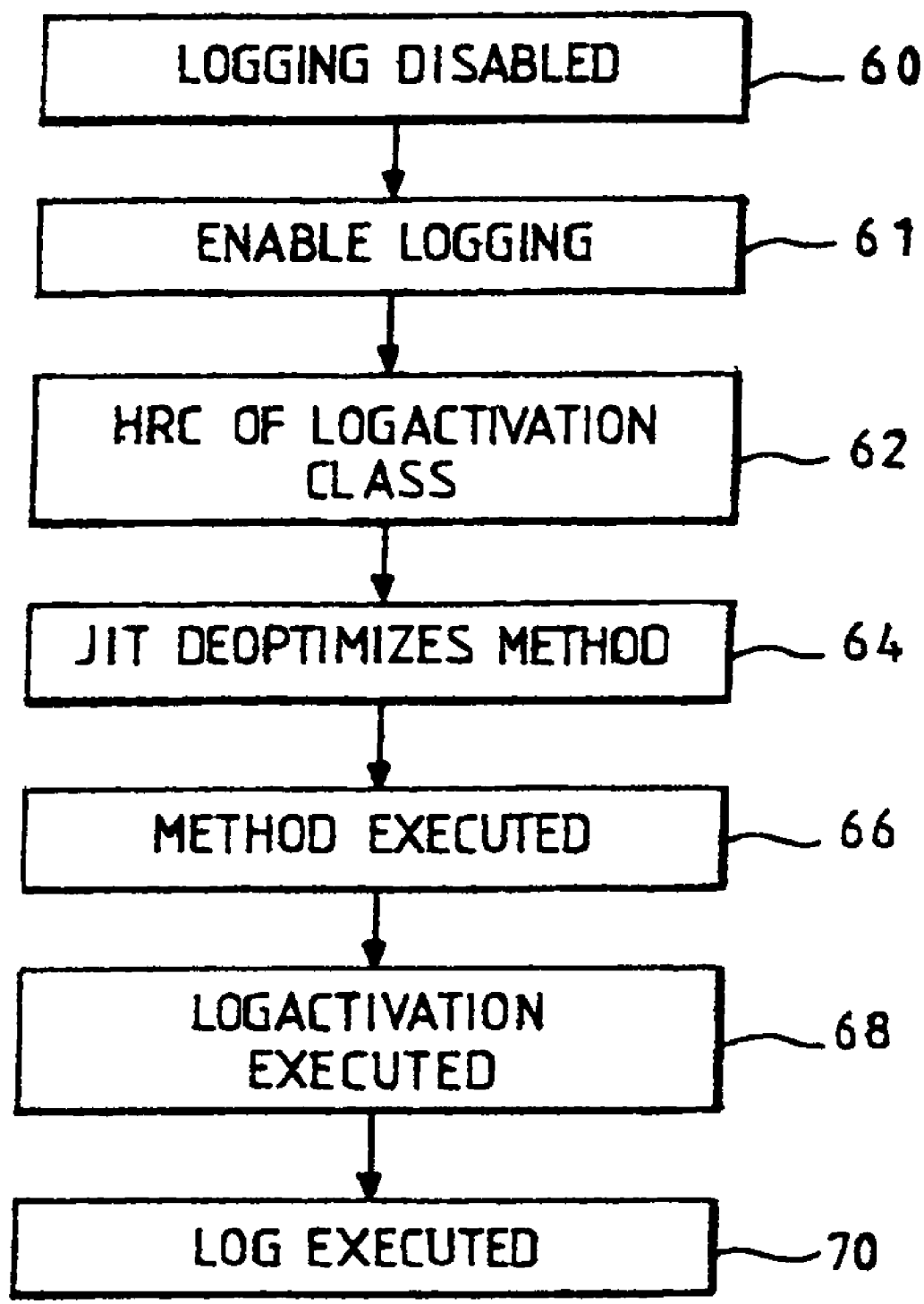
FIG. 4 is a flow diagram of the process steps for JIT compiling a Java class file containing that run-time determined software routine that has been activated in accordance with a preferred embodiment of the present invention.

FIG. 4 illustrates the process steps embodying the above described process in the preferred embodiment of the present invention. In a running system, logging is disabled (step 60). However the user may change their mind regarding the state of this feature and modify the system by enabling the logging feature (step 61) and introducing a new implementation of the LogActivation class using HCR (step 62). The JIT will identify those methods which use the LogActivation class and in the case where these have been compiled and optimised will cause them to revert to a deoptimised version (step 64). This ensures that on a subsequent invocation of a method (step 66) that uses logging the new implementation of the LogActivation.enable( ) method is used (step 68) and a call to logging made (step 70). The JIT is free to reoptimise these methods excluding the guard from generated native machine code. The method is then executed with logging.

It will be appreciated that the implementation of as described in the foregoing with respect to a logging method is merely illustrative and is not to be considered as limitative with respect to its scope. It will be understood that the methods described above can be applied to any Java class file that employs a Boolean parameter to resolve a conditional checking statement.

Since JIT compilation occupies a part of the application run time, it is not necessarily beneficial to compile all the methods being invoked. For example, when a method is executed only once and does not contain any loops, the overall performance might be degraded if it is JIT-compiled. The cost of the JIT compilation needs to be offset by the performance gain achieved by running the native machine code in terms of both time and space. Consequently, in an alternative embodiment of the present invention "hot methods" are selected to be compiled rather than seeking to also compile methods that are used infrequently or only once. This can be achieved by a method invocation count for each method and initialised as a certain threshold value. Whenever the method is executed by the JVM interpreter, the invocation count is decremented. When the count reaches zero, it is determined that the method has been invoked frequently enough, and Java JIT compilation starts for that method.

The invention claimed is:

1. A method of changing a status of a run-time determined software routine between activated and deactivated, comprising:
   employing an invariant flag to evaluate a conditional statement associated with said run-time determined software routine to determine the status as one of activated or deactivated, said invariant flag being selected to cause said conditional statement to always evaluate to a known result; and
   during run-time, utilising a run-time code replacement facility to change said invariant flag to a second invariant flag that causes said conditional statement to always evaluate to a different known result; and
   optimizing said run-time determined software routine by excluding from compiled native machine code the run-time determined software routine when the invariant flag is selected to cause the conditional statement associated with said routine to evaluate to the different know result.

2. A method as claimed in claim 1, wherein the invariant flag comprises one of a final static Boolean parameter, a numerical test on an invariant held and a hard coded statement and wherein said step of utilising a run-time code replacement facility to change said invariant flag comprises changing a value of the Boolean parameter, changing the invariant field or replacing the hard coded statement by its converse.

3. A method as claimed in 2, wherein said final static Boolean parameter comprises a final static Boolean data type.

4. A method as claimed in claim 1, wherein said run-time determined software routine comprises a class file.

5. A method as claimed in claim 4, wherein it includes the step of just-in-time (JIT) compiling methods of the class file.

6. A method as claimed in claim 5, wherein a interpreter maintains a method invocation count for each method of the class file and wherein the method includes the step of JIT compiling only those methods whose invocation count exceeds a threshold value.

7. A virtual machine (VM), stored on a memory for execution on a processor, arranged to carry out the method of changing a status of a runtime determined software routine between activated and deactivated, the VM being configured for:
   employing an invariant flag to evaluate a conditional statement associated with said run-time determined software routine to determine its status as one of activated or deactivated, said invariant flag being selected to cause said conditional statement to always evaluate to a known result; and
   during run-time, utilising a run-time code replacement facility to change said invariant flag to a second invariant flag that causes said conditional statement to always evaluate to a different known result; and
   optimizing said run-time determined software routine by excluding from compiled native machine code the run-time determined software routine when the invariant flag is selected to cause the conditional statement associated with said routine to evaluate to the different known result.

8. A just-in-time (JIT) compiler, stored on a memory and executed on a processor, arranged to carry out the method of changing a status of a run-time determined software routine between activated and deactivated, the method comprising:
   employing an invariant flag to evaluate a conditional statement associated with said run-time determined software routine to determine its status as one of activated or deactivated, said invariant flag being selected to cause said conditional statement to always evaluate to a known result; and
   during run-time, utilising a run-time code replacement facility to change said invariant flag to a second invariant flag that causes said conditional statement to always evaluate to a different known result; and
   optimizing said run-time determined software routine by excluding from compiled native machine code the run-time determined software routine when the invariant flag is selected to cause the conditional statement associated with said routine to evaluate to the different known result.

9. A computer program product in a computer readable medium for carrying out the method of changing a status of a run-time determined software routine between activated and deactivated, said method comprising:
   employing an invariant flag to evaluate a conditional statement associated with said run-time determined software routine to determine the status as one of activated or deactivated, said invariant flag being selected to cause said conditional statement to always evaluate to a known result; and
   during run-time, utilising a run-time code replacement facility to change said invariant flag to a second invariant flag that cause said conditional statement to evaluate to a different known result; and
   optimizing said run-time determined software routine by excluding from compiled native machine code the run-time determined software routine when the invariant flag is selected to cause the conditional statement associated with said routine to evaluate to the different known result.

* * * * *

UNITED STATES PATENT AND TRADEMARK OFFICE
CERTIFICATE OF CORRECTION

PATENT NO.        : 7,665,076 B2                                    Page 1 of 1
APPLICATION NO.   : 10/860412
DATED             : February 16, 2010
INVENTOR(S)       : Clement et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Seventh Day of December, 2010

David J. Kappos
*Director of the United States Patent and Trademark Office*